United States Patent [19]
Barker

[11] 4,046,986
[45] Sept. 6, 1977

[54] APPARATUS FOR MAKING PRINTING PLATES AND OTHER MATERIALS HAVING A SURFACE IN RELIEF

[75] Inventor: Ronald C. Barker, Weston, Mass.

[73] Assignee: Applied Display Services, Inc., New York, N.Y.

[21] Appl. No.: 620,897

[22] Filed: Oct. 8, 1975

Related U.S. Application Data

[60] Continuation of Ser. No. 404,532, Oct. 9, 1973, abandoned, which is a division of Ser. No. 86,656, Nov. 4, 1970, Pat. No. 3,832,948, which is a continuation-in-part of Ser. No. 883,525, Dec. 9, 1969, abandoned.

[51] Int. Cl.² .................................................. B23K 9/00
[52] U.S. Cl. ........................ 219/121 LM; 219/121 L
[58] Field of Search .................... 219/121 L, 121 LM; 101/401.1, 453, 395; 346/76 L; 178/6.6 B, 6.6 TP, 6.6 DD, 6.8

[56] References Cited

U.S. PATENT DOCUMENTS

| | | | |
|---|---|---|---|
| 1,803,548 | 5/1931 | Drake .................................. | 101/395 |
| 3,181,170 | 4/1965 | Akin ............................ | 219/121 L X |
| 3,293,652 | 12/1966 | Roshon, Jr. et al. ........ | 219/121 L X |
| 3,435,186 | 3/1969 | Roshon, Jr. et al. ..... | 219/121 LM X |
| 3,506,779 | 4/1970 | Brown et al. ..................... | 101/395 X |
| 3,549,733 | 12/1970 | Caddell ..................... | 219/121 LM X |
| 3,560,291 | 2/1971 | Foglia et al. ............. | 219/121 LM X |
| 3,588,440 | 6/1971 | Morse ............................... | 219/121 L |

OTHER PUBLICATIONS

"Laser-Etched Printing Plates May Soon Be A Reality" by W. T. Reid, Inland Printer/American Lithographer, vol. 154, No. 3, 12-1964, pp. 57 & 113.

*Primary Examiner*—J. V. Truhe
*Assistant Examiner*—Fred E. Bell
*Attorney, Agent, or Firm*—Seidel, Gonda & Goldhammer

[57] ABSTRACT

A surface in relief is formed by scanning coherent radiation over a surface defined by a thin film supported upon a plastic substrate. The wave length of the coherent radiation is chosen so that it is absorbed by the film and hence removes portions of the film exposing the substrate. The coherent radiation for removing the film may be switched on and off or otherwise modified so as to write information on the surface. Thereafter, the surface is again scanned by coherent radiation of a wave length that is reflected by the film but absorbed by the plastic substrate thereby removing portions of the plastic exposed by the coherent radiation. The film may or may not then be completely removed leaving a pattern in relief upon the surface of the substrate.

9 Claims, 6 Drawing Figures

U.S. Patent   Sept. 6, 1977   Sheet 1 of 2   4,046,986
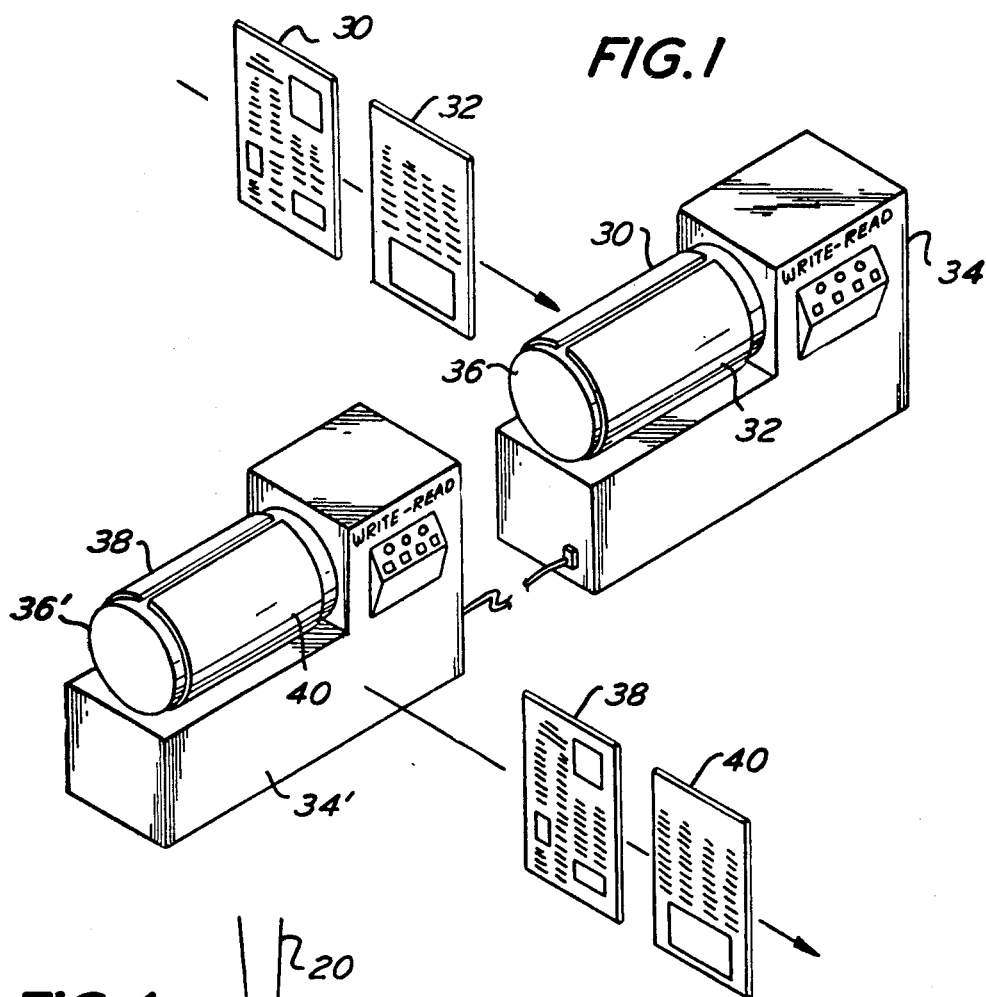
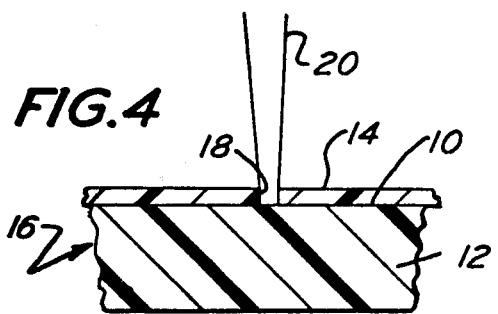
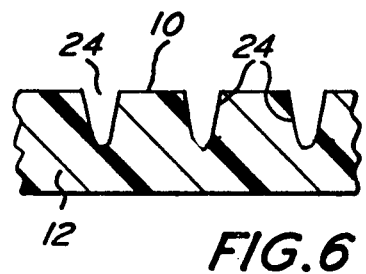
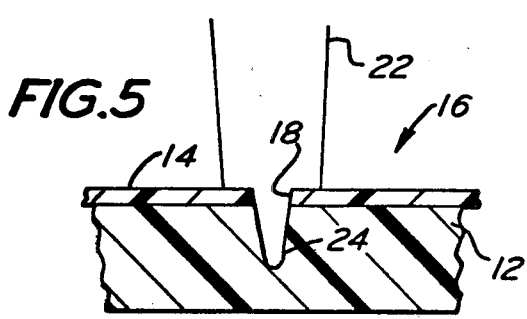

APPARATUS FOR MAKING PRINTING PLATES AND OTHER MATERIALS HAVING A SURFACE IN RELIEF

This is a continuation of application Ser. No. 404,532 filed Oct. 9, 1973 now abandoned, said application Ser. No. 404,532 being a divisional application of Ser. No. 86,656 filed Nov. 4, 1970 now U.S. Pat. No. 3,832,948, said application Ser. No. 86,656 being a continuation-in-part of application Ser. No. 883,525 filed Dec. 9, 1969 now abandoned.

This invention relates to a method and apparatus for making letter press, offset, and gravure printing plates and other products having a surface in relief. More particularly, this invention relates to a method and apparatus for using coherent radiation to make printing plates.

One of the earliest and most well known uses for lasers, and their equivalents, is to burn or melt materials of all types. Thus, it is characteristic of coherent radiation that it is capable of being concentrated so as to apply relatively large amounts of energy to small areas. In other words, it can be concentrated so as to maximize its power density. Given the foregoing, it follows that coherent radiation should be capable of being used in manufacturing processes of any kind that require the removal of quantities of material. Indeed, coherent radiation has been so used, and with some moderate success.

Unfortunately, material removal processes which use lasers and other devices for generating coherent radiation have been only moderately successful. This failure to meet expectations has been due in part to the inability to get both speed and accuracy (resolution) in the removal process. Speed, of course, is directly related to the amount of energy that can be concentrated per unit amount of time. Unfortunately, devices presently available for producing the requisite large amounts of coherent energy are also the devices which produce radiation in the longer wave lengths. For example, high energy levels of coherent radiation can be obtained from carbon dioxide lasers which have a wave length of approximately 10,600A. Such longer wave lengths cannot be concentrated as well as shorter wave length coherent radiation; e.g., radiation in the visible life region, such as light developed by an argon laser at approximately 4880A. Hence higher power devices lack resolution. On the other hand shorter wave length coherent radiation devices, such as the aforementioned argon laser, in the present state of the art cannot develop the power levels of a carbon dioxide laser. They are therefore slow to remove material.

The present invention is concerned with the use of coherent radiation to remove quantities of material from an object so as to form the surface of that object in relief. Although the present invention will be described in terms of devices for manufacturing printing plates, it should be understood that it has numerous other applications which would be readily apparent to those skilled in the art. For example, the invention could be used for engraving processes, for manufacturing printed circuit boards, for etchings of all types, for facsimile and in any other process where it is desirable to form a surface in relief. Another use is for inputting and outputting computer memory devices for storing information for future use, particularly in the newspaper industry. Thus a memory storage could replace the so-called "newspaper morgue".

One of the most common processes used in the printing industry is the formation of duplicate plates (e.g. stereotype or electrotype). As the name implies, duplicates of original plates or type pages are produced. These are used for long runs, as in the case of metropolitan newspapers and nationally circulated magazines; for jobs where the originals must be preserved for future use; for jobs to be run in multiples; and when identical plates must be sent to several printers or publishers for use at the same time.

The oldest form of duplicate plate is the stereotype, used mostly by newspapers. In this process, the original type page is locked firmly in a heavy metal frame called a chase and a thick sheet of papier mache forced down upon it by mechanical or hydraulic pressure so as to form a mold or mat (short for matrix) of the page. From this a plate is cast in type metal which duplicates the printing surface of the original page. If the plate is intended for use in a large rotary press, it will be semi-cylindrical in shape; if for use on a smaller tubular rotary press, cylindrical; and if intended to print with type on a flat-bed press, flat. The stereotyping process is quick, relatively inexpensive, and especially suited for use by newspaper publishing several editions in which the front page and certain inside pages must be remade from issue to issue.

In recent years duplicate plates of vulcanized rubber and of plastic have come into use. The advantages of plastics include light weight, ease of handling on the press, and lower shipping costs. One such plastic is sold by The DuPont Company, Wilmington, Delaware and consists of a flexible photo polymer plastic plate which is durable and light in weight.

The electrotype process is also used for better quality duplicate plates.

Through the years there have been a number of improvements in process for making duplicate plates. Despite this, the process has several basic disadvantages. Among them is the fact that photo composition cannot be used economically. In other words, the newspaper and other printing establishments cannot take advantage of the recent developments in photography as developed for other printing processes.

Recognizing this limitation, attempts have been made to generate the plates and duplicate plates directly without the intermediate steps of typesetting by means of a Linotype or intertype machine. One such attempt has used electron beams to write directly upon a surface. This latter process, however, has not met with success because amongst other things it lacks the necessary resolution. Indeed, one of the difficulties with the present stereotype process is loss of resolution in generating mats for duplicate plates. It therefore follows that any new process must not further deteriorate the current resolution of printing plates, whatever may be its further advantages.

The present invention is directed to a method and apparatus for generating printing plates which not only have greater resolution, but also increase the speed at which the plates can be generated. Moreover, the present invention has the advantage of being able to directly generate the plates without the intermediate step of typesetting. The present invention is particularly suited for generating letter press and intaglio as well as planographic plates including lithograph and offset plates.

In accordance with the present invention, it has been determined that coherent radiation can be used to directly form printing plates with a high degree or resolution and at a relatively high speed. The present invention overcomes the difficulties of previous attempts to use coherent radiation for this purpose.

In accordance with the present invention, it has been found that mats and other materials upon which it is desired to form a surface in relief can be generated by using a two-step process consisting of a write step followed by a developing step. Each step uses a separate and distinct source of coherent electromagnetic radiation. More specficially, the present invention incorporates the concept of first writing upon a surface using coherent radiation of a relatively shorter wave length and hence higher resolving qualities. Thereafter what has been written upon the surface is developed by using a relatively high power coherent radiation source. The meaning of the terms "writing" and "developing" can be ascertained from what is disclosed hereinafter.

According to the present invention, the plate having a surface to be written upon consists of a substrate of plastic coated with a relatively thin absorptive film. The writing step takes place by scanning a coherent beam over the film to remove selected portions of the film. Each area of film is removed by a relatively low power but highly resolved coherent radiation. The areas removed can and in most cases will represent information. The information is formed by controlling the low power coherent rediation either by modulating it, switching it on and off or by shaping it. Thereafter, the plate is again scanned by a steady state beam of relatively high power coherent radiation: This second beam is reflected by the film but absorbed by the plastic substrate. That portion of the substrate which has been exposed by the writing step is removed with the result that a surface in relief has been formed. The precise information on the surface in relief will depend directly upon the information conveyed by the writing step.

Using the foregoing two-step process, the resulting plate can be either a positive or negative image as required. For example, the formation of a letter press plate requires that the material around the various alpha-numeric figures, line drawings, half tones and the like be removed so as to leave the images to be printed in relief. The formation of a plate for the gravure process requires just the opposite effect. The information that is to be printed is formed on the plate by a form of depressions. Even in the letter press process it may be desirable to simply form a mat for molding letter press plates. Therefore, the information is written in the form of debossed images rather than embossed images. Of course, for printing, mirror images of the information must be formed when making letter press plates.

One of the advantages of this invention is that the formation of embossed or debossed information as well as the formation of true or mirror images of the information can be accomplished in a straightforward manner.

For the purpose of illustrating the invention, there are shown in the drawings forms which are presently preferred; it is being understood, however, that this invention is not limited to the precise arrangements and instrumentalities shown.

FIG. 1 is a perspective view of a system incorporating the present invention.

FIG. 4 is a highly enlarged sectional view illustrating the writing step.

FIG. 5 is a highly enlarged sectional view illustrating the developing step.

FIG. 6 is a highly enlarged transverse sectional view illustrating the final printing plate or other surface in relief.

Figure 2:
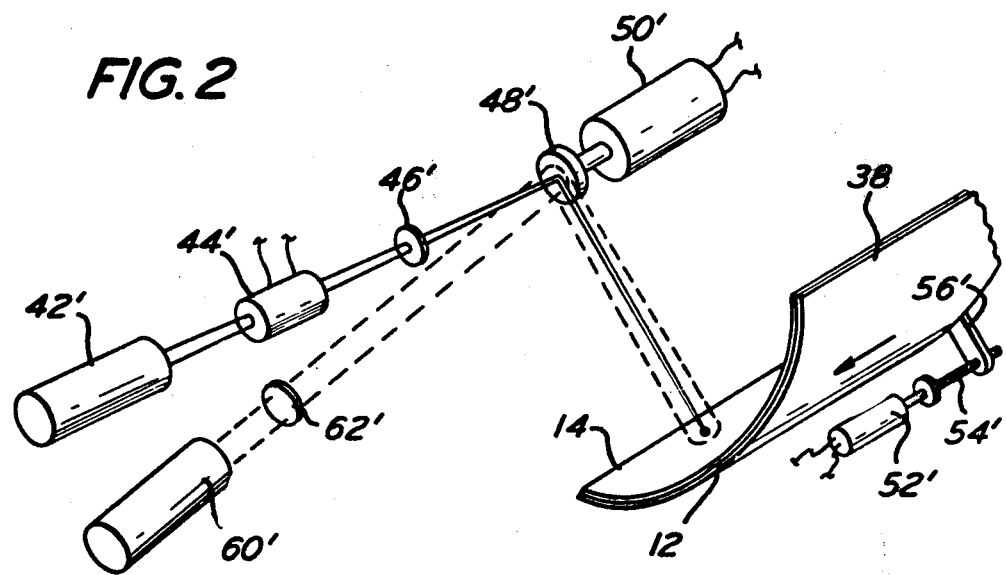
FIG. 2 is a perspective view illustrating the writing and developing for the present invention.

Referring now to the drawings in detail, wherein like numerals indicate like elements, there is shown in FIGS. 4, 5 and 6 a three-step process for forming a surface in relief.

The surface to be formed in relief is designated as 10 and defined by the surface of a plastic substrate 12. The surface 10 of the substrate 12 is covered with a film 14 which may be referred to as the writing coating. Film 14 is preferably metallic such as, by way of example, aluminum, copper or nickel, but other materials may be used so long as they are absorptive of the coherent radiation generated during the writing step. The surface 10 to be formed in relief is primarily the interface between the substrate 12 and the metallic film 14. Together, the substrate 12 and writing coating 14 may be referred to as the initial or composite plate 16.

As previously indicated, the substrate 12 is preferably made of a plastic material. However, it may be made of other materials, provided that such material is capable of absorbing coherent radiation of a particular predetermined frequency and that frequency can be reflected by the film 14. As used herein, the word plastic means a material that contains as an essential ingredient an organic substance of large molecular weight, is solid in its finished state, and, at some stage in its manufacture, or in its processing into finished articles, can be shaped by flow. When composite plate 16 is used to make letterpress plates for printing it is preferably made of a plastic material which is suitable for that purpose. When the plate 16 is used to manufacture mats for duplicate plates, it is preferably made of plastic material which is suitable for that process.

The writing coating 14 is chosen so as to be relatively absorptive of radiation of a particular wave length and relatively reflective of radiation of another wave length as explained below. In its preferred form, writing coating 14 is a metal film that will absorb green light but reflect infrared radiation. One such film by way of example may be aluminum which is coated on surface 10 of substrate 12 at a thickness of approximately 350 angstrom units. The thickness of the film, as well as the type may vary. For most applications, 100–10,000 angstrom units is satisfactory.

In accordance with the present invention, coherent electromagnetic radiation in the infrared and visible regions of the spectrum is to be used to form the surface 10 in relief. As previously indicated, attempts have been made to use radiation to so form a surface in relief. However, these attempts have met with little or no success. One such attempt involved the use of modulated electron beams. The process, however, was relatively slow and the resolution or quality of the end result was poor. Other attempts have involved the use of coherent radiation in the visible region of the spectrum, but they too have been unsuccesful.

The foregoing problems of resolution and speed are overcome by providing a two-step process for initially forming the surface relief. This two-step process is directly related to the composite plate 16 illustrated in FIG. 4. The reason for a film 14 on the substrate 12 is directly related to the process for manufacturing the same. In accordance with the present invention, a relatively low power laser with good resolution is used to write on the plate 16 by removing only a selected portion of the relatively thin writing coating 14 to form a hole 18 therein. Relatively little energy is required to remove the small amount of material represented by the film 14 at hole 18. Hole 18 represents the position where the laser radiation 20 is concentrated. The process of removing a small portion of the writing coating 14 to form the hole 18 may involve one or more combinations of the processes of oxidation, ablation, vaporization or burning of the film 14.

What has so far been described is of course, the formation of a single hole 18 in the writing coating 14. The size and number of holes 18 is multiplied and spaced out to form dots, lines, spaces and the like. Together they form exposed areas that define intelligible information. It is, of course, a relatively straightforward process to expose areas of substrate 12 in a pattern. This can be accomplished by scanning the laser beam 20 to form a raster. At the same time that the beam is scanned, it is switched on and off as it is scanned. In so switching the beam, areas of various size and shape are formed in the writing coating 14. Since the writing coating relatively thin and hence does not require the removal of very much material, the film can be removed at a very high rate of speed. The rate and the manner in which the laser beam 20 is switched on and off is directly related to the information to be formed in relief on the surface 10.

Coherent radiation 20 can be visible or near visible light in the range from 2,000–20,000 angstrom units. For example, it may have a wave length of approximately 4880A such as is developed by the well known argon laser. Scuh coherent radiation is green in color and has a wave length which permits it to be readily concentrated down to a hole diameter size of less than 0.001 inch if desired.

Once areas or portions of coating 14 have been removed, they form what may be referred to as a mat of openings in the film 14 which expose the surface 10 of the substrate 12. As is explaned hereinafter, the open areas 18 permit the rapid removal relatively large amounts of exposed substrate 12 using coherent radiation at a much higher power level than that developed by the argon laser or its equivalent. The advantage of the argon laser, or any other laser generating radiating at the correct wave length, is that it develops visible radiation which can be readily concentrated into hole diameters of less than 0.001 inches and it can be readily scanned. The disadvantage of an argon laser is its relatively low power level.

Having thus written upon the composite 16, it now becomes necessary to develop the same to actually form the surface 10 in relief. To do this, the writing coating 14 is again scanned by or otherwise exposed to coherent radiation as illustrated in FIG. 5. However, the coherent radiation used in this instance is of a wave length which is absorbed by the substrate 12 and reflected by the film 14 as previously described. The coherent radiation used for the part of the process is at a power level sufficient to remove exposed portions of the substrate 12. Indeed, it is at the power level sufficient to remove the exposed plastic down to a depth as required by the printing process. In addition to being higher in power, the coherent radiation chosen for this purpose is at a wave length that is reflected by the remaining portions of the film 14. The radiation is preferably in the wave length range from 10,000 to 100,000A. The reason for this is that the wave lengths of this higher power coherent radiation 22 cannot be resolved to the dimensions of the radiation 20. Therefore, a good portion of the radiation is incident upon the film 14 as well as the base of hole 18. In ay case, the coherent radiation 22 is incident upon the exposed areas and removes portions thereof by burning a relief pattern in the substrate 12.

The coherent radiation 22 is preferably scanned across the surface of film 14 in a manner similar to the radiation 20. The radiation 22 may be modulated if desired to vary depth or for other reasons. In the course of being scanned over the coating 14, the radiation 22 may remove material from as much as 100% of the area of the surface 10.

For purposes of this invention, it has been found that a $CO_2$ laser which develops coherent radiation in the infrared region of the electromagnetic spectrum (approximately 10,600A) is capable of generating power levels required for performing the developing step. The diameter of the radiation incident upon the coating 14 is approximately ¼ to 1 inch when using a carbon dioxide laser. Regardless of actual size, the criteria is that the diameter of incident radiation be a spot size significantly larger than the spot size of the radiation used for writing. The scanning rate is much slower than that used for the laser radiation 20 as indicated below.

As a final step in the process for forming the relief in the surface 10, the coating 14 may but not necessarily be removed form the substrate 12 leaving only areas 24 in relief as indicated in FIG. 6. The pattern of the relief is the same as that of the areas 18 formed in the writing step. Consequently, the surface 10 of the substrate 12 can now form in relief information as derived from the switching control of radiation 20.

It should be noted that one of the advantages of processes thus described is the physical characteristics of the areas 24 in that they are fully compatible with letter press plate requirements. Past methods of forming patterns in relief on surfaces have tended to make or form areas 24, or their equivalent, that, for reasons associated with structural soundness or surface characteristics, are incompatible with the letter press process. In particular, the depth of the areas removed by the $CO_2$ laser or its equivalent can vary with the diameter of the hole or aperture in the film 14 for a constant developing energy density. Still further, the edges of the areas at surface 10 can be relatively sharp while the bottom of the areas can be curved. This is best illustrated in FIG. 6 wherein it may be observed that the upstanding portions of the substrate 12 remaining after the application of the coherent radiation 22 are wider at their bases than they are adjacent the top surface. Thus, the upstanding portions are structurally sound.

As previously indicated, the printing industry, particularly newspaper publishers, are limited in their ability to take advantage of newly developed composing processes, particularly those that take advantage of photographic techniques. Still another disadvantage is the requirement that uses the initial typesetting process involving the use of Linotype or intertype machines. As a result of the present invention, it is now possible to eliminate the use of the intermediate typesetting process and to take advantage of and use photocomposition. Indeed, the present invention makes possible what may be described as a "real time" process for making printing plates, particularly letter press plates. In other words, the present invention makes it possible to go directly from a page composed by any known technique to a plate.

In accordance with the present invention, page composition is read by an optical reading device and a plate is simultaneously or subsequently formed with the same information. Such a system has several advantages, not the least of which is the fact that the plate is made directly without using any metal typesetting step. Still further, any input can be used, meaning that the page composition may, for example, consist of any form of printed, computer generated or photographic information. Still further, the present invention not only saves time but, unlike previous attempts, can appreciably improve the resolution of the resulting printing plate.

Referring now to FIG. 1, there is shown in schematic form what may be described as a system for generating letter press plates.

The pages of graphics 30 and 32 containing both written and pictorial subject matter are shown mounted on a drum transport 36 of the write-read apparatus 34. Of course one, two, or more pages of graphics can be so mounted. The graphic pages 30 and 32 can be made up in any manner. For example, they could be conventional newspaper pages made up using a photocomposition process. It should be understood, however, that the graphic pages 30 and 32 are merely representative of any type of material which is to be printed. The graphic pages 30 and 32 could be maps, photographs, book pages, or any combination of written and pictorial subject matter. The only requirement for the graphic pages 30 and 32 is that they are capable of being read by the optical reading device contained within the write-read apparatus 34.

Once mounted on the drum transport 36, the write-read apparatus 34 is energized in a read mode; that is, it optically scans the information contained on the graphic pages 30 and 32 and converts that information into some form of electrical or radio signal containing the same information for transmission by any suitable means to the write-read apparatus 34'. The write-read apparatus 34' can be identical to the write-read apparatus 34 with the exception that it is operating in a write mode. By that, it is meant that the information bearing signal generated by the write-read apparatus 34 is being received, transduced, and thereafter used to form a letter press plate according to the method previously described. The write-read apparatus 34' could be located adjacent the write-read apparatus 34 or it could be located at some remote location any number of miles away and connected by telephone lines or other suitable signal transmission media. It could also be integrated with the apparatus 34. Separated apparatus 34 and 34' are shown for ease of description. Since apparatus 34 and 34' can be the same, it is possible to switch modes so that apparatus 34' reads and apparatus 34 writes.

The use of duplicate machines such as indicated above permits composition to be performed at one location and printing at another location in an economical manner. There are many economic advantages to physically separating the printing operation from the writing and composing operation. For example, it is desirable for the headquarters and news room of a large metropolitan newspaper to be located near the commercial center of the city. There is, however, no necessity for the printing plant to be similarly located. The problems of distributing a printed newspaper are not necessarily the same as those of gathering the news. The newspaper could actually be printed in an outlying section of the city and distributed from that point.

In any case, the write-read apparatus 34', operating in its write mode, processes the information received from the write-read apparatus 34 and generates two letter press plates 38 and 40 bearing the same information that is contained on graphic pages 30 and 32. Of course one, two or more plates can be generated. The plates 38 and 40, may now be used to print.

Figure 3:
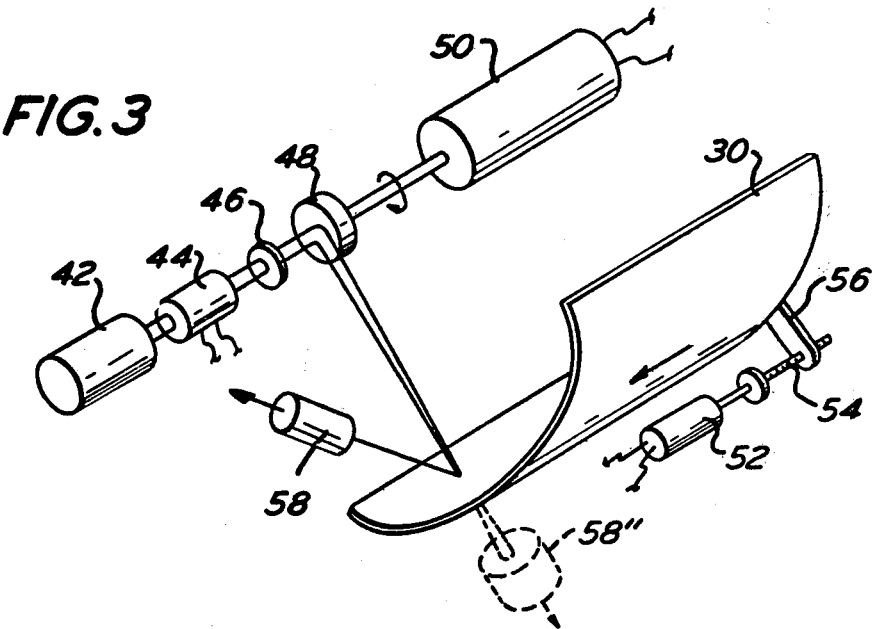
FIG. 3 is a perspective view of a system for reading in accordance with the present invention.

Referring now to FIGS 2 and 3, there is shown apparatus for performing both the read and write modes of the write-read apparatus 34 and 34'. The read mode is illustrated in FIG. 3 and may be performed by any well known optical scanning and reading apparatus. Since the apparatus 34 may perform both a read and write function, it is possible to duplicate certain functions. For example, the same laser that performs the writing step can also be used to generate the requisite light spot for a read scanner. This laser is shown as laser 42 of FIGS. 3 and 2. Light generated by laser 42 passes through light modifier 44, focusing optics 46 and then is reflected by scanning mirror 48 onto the surface of graphic page 30. Only page 30 is shown for clarity. It should be understood that one or more graphic pages 32 may be located farther around the circumference of drum transport 36 and could be equally scanned by the light generated by laser 42. Modifier 44 can be adjusted so as to reduce the power of the light generated by laser 42 to a point where it does not physically effect the graphic page being scanned. Optical system 46 is a high quality lens system which focuses the light on graphic page 30. Mirror 48 is rotated at the requisite speed so as to scan the beam of light focused by focusing optics 46 across the graphic page 30. Mirror 48 is driven by a mirror drive motor 50.

The foregoing described apparatus generates a line scan of the light spot generated by laser 42. To produce a scan in both directions or a raster, the drum transport 36 is displaced by a transport drive motor 52 which turns an appropriate mechanical linkage such as a screw 54 that is threadedly engaged in linkage 56 connected to the drum transport 36. Thus, the apparatus illustrated in FIG. 3 is an X-Y raster scanner. As such, it causes a high intensity spot of light to scan the entire surface of the graphic page 30 as well as the surface of graphic page 32 (not shown).

In the embodiment illustrated the graphics 30 are mounted on the outer surface of the transparent drum 36 which is moved linearly with respect to the objects. It should be understood that other forms of relative motion could be created. For example, the drum could be rotated and the optics moved linearly. Equally, the optics could be both rotated and moved linearly. Indeed, there is no requirement that the graphics or plate actually be mounted on a drum. They could be simply mounted on a surface and appropriately scanned by the optics.

Light incident upon the page 30 is reflected therefrom and detected by a photosensitive detector 58. Detector 58 transduces the signal into an electronic signal which may be processed through any conventional communication mode for transfer to the write-read apparatus 34'. The signal should be processed so as to generate a control signal that results in a printing plate. Of course, if the plate is to be used as a mold for the stereotype process, then a negative plate is required. In essence then, the apparatus as illustrated in FIG. 3 is functioning as a read scanner for reading the information contained on graphic pages 30 and 32.

If desired, the detector 58 could be positioned on the opposite side of the graphic page 30 as indicated in FIG. 3. In this manner, transmitted rather than reflected light would be detected. Other than this, the function of detector 58' is the same. Still further, the optics in their entirety could be on the opposite side of the drum.

Although not shown, it should be understood that the drive motors 50 and 52 are operated in synchronism by appropriate serve-control mechanism (not shown). Drive motor 52 may be a stepper motor which advances the drum transports an appropriate amount upon receipt of an electronic signal from a system control logic (not shown). The system control logic can also be used to provide synchronizing controls for the motor 50.

Referring now to FIG. 2, apparatus for writing and therefore forming a letter press plate is illustrated. Although the apparatus illustrated in FIG. 2 would be in its entirety the same as the apparatus illustrated in FIG. 3, for purposes of clarity only that apparatus relative to the writing mode is shown. Moreover, the apparatus is designated by a prime number as is the write-read apparatus 34'.

As shown in FIG. 2, light is generated by laser 42'. This light passes through modifier 44', focusing optics 46' and then is reflected by mirror 48' onto the surface of composite plate 38. Composite plate 38 is the same as initial plate 16 illustrated in FIG. 4. That is, it includes a plastic substrate 12 coated with a metallic film 14.

Composite plate 38 is mounted on drum transport 36' which is driven by transport drive motor 52' through screw 54' and linkage 56'. Drive motor 50' turns mirror 48' so that the light focused by focusing optics 46 is scanned over the surface of plate 38. In other words, a raster is generated in the same manner as was generated by the read mode described with respect to FIG. 3. The difference in this instance, however, is that the coherent radiation generated by laser 42' has sufficient energy to burn the film 14 as it is scanned across the surface of composite plate 38. Thus, the previously described writing step in the process is being performed. During this write step, the signal initially generated by detector 58, with appropriate electronic modifications as indicated above, is applied to the input of light modifier 44'. Modifier 44' is now turning on and off at a varying rate corresponding to the information contained on graphic page 30 in the form of light and dark images. As the modifier 44 turns on and off, the light generated by laser 42 is similarly being modified. The result is that a plurality of areas 18 are removed from the coating 14 on the plate 38. These areas correspond to the information originally on graphic page 30.

Once the plate 38 has been scanned and the requisite areas 18 formed, the developing step can be performed. For the developing step, laser 60' is energized. Laser 60' generates radiation which, as previously described, is reflected by the coating 14 but absorbed by the substrate 12. An appropriate optical system 62' directs the radiation generated by laser 60' against mirror 48' which in turn reflects onto the coating 14 with the requisite holes 18 burned therein. Focusing system 62 actually functions to defocus the radiation generated by laser 60 so that it forms a spot size or image area substantially larger than the diameter of the image formed by the write laser and its optics. The radiation generated by laser 60' is now scanned over the surface 14 of plate 38 in the manner previously described with respect to scanning light generated by laser 42'. As it is scanned, it burns and hence removes portions of the substrate 12 which have been exposed by the formation of the areas 18 in film 14. Accordingly, a plurality of depressed areas 24 are formed by the substrate 12. These areas 24 correspond to the areas 18. Moreover, the surface of substrate 12 has now been formed in relief; and the relief pattern corresponds to the formation which was originally contained on graphic page 30, although it may be a negative or mirror image thereof.

After the radiation generated by laser 60' has been completely scanned over the surface 14, plate 38 is removed from the drum transport 36'. Of course, plate 40 is also removed at the same time since it also has been written upon and developed simultaneously with plate 38. However, plate 40 contains the information which originally appeared on graphic page 32. Upon removal, plates 38 and 40 may be processed to completely remove the remainder of the coating 14. However, for letter press plates removal is unnecessary. Thereafter, the substrate 12 may be used for the printing process.

Although those skilled in the art will readily recognize that there are several types of apparatus for performing the foregoing described processes, by way of example, not limitation, one set of apparatus which may be used is as follows:

It will be assumed that the two graphic pages 30 and 32 contain information on an area measuring 18 × 24 inches and that the plates 38 and 40 measure 18 × 24 inches. For this purpose, drum transport 36 may be a cylinder having a circumference of approximately 44 inches. The length of the drum transport should be approximately 26 inches. This means that the two graphic pages 30 and 32 may be laid on the surface of the drum side-by-side with a space between them totaling approximately 8 inches. This additional space may be used for synchronizing in linear displacement purposes the end of each line of scan.

The lasers 42 and 42' may be argon lasers capable of generating energy at approximately 4880A which is in the green light region of the electromagnetic spectrum. The laser 60' may be a carbon dioxide ($CO_2$) laser which generates electromagnetic radiation at a wave length of approximately 10,600A which is in the infrared region of the electromagnetic spectrum. The modifiers 44 and 44' may be electro-optic light modifiers (sometimes called modulators) controlled by apropriate electronic driving apparatus such as is known by those skilled in the art. The modifiers 44 and 44' will generally operate between 10 to 100 MHz with an on/off function of in excess of 20/1.

The optics 46 and 46' focus light generated by lasers 42 and 42' down to a spot size of approximately 0.001 inches in diameter. At that diameter, one thousand areas 18 per inch can be generaged totaling eighteen thousand areas per line.

Stepper motors 52 and 52' can be used to displace the graphic pages and the plates 0.001 inches per step so that the raster will be one thousand lines per inch.

The motors 50 and 50' drive the mirrors 48 and 48' at an appropriate velocity. The mirrors could be made of beryllium or other high strength materials according to the standards normally associated with such mirrors when used for high speed camera work. With the mirror rotating at 1600 revolutions per second, each 18 inch line cycle will be $0.625 \times 10^{-3}$ seconds. The stepper motors 52 and 52' will transport the drum transports 36 and 36' approximately 1.6 inches per second. At the foregoing specifications, the single plates can be generated in approximately 10 seconds. As previously indicated, the developing laser 60' may be defocused by the focusing system 62' so that the spot image on the film 14 is significantly larger than the diameter of the write laser spot.

Although the foregoing system was described with respect to the generation of plates for letter-press printing, it should be understood that the system can equally be useful for other forms of printing and is not in any way limited as to the type of input. Still further, although the system illustrated in FIG. 1 shows two read-write apparatus, it is also contemplated by the present invention that there can be any number of read-write aparatus. Thus, centralized read-write apparatus 34' could be used to control 2, 3 or more read-write apparatus 34' at several remote locations.

The advantages of the present system are that the printing plates are made in a very short amount of time and directly from the page as composed, without the intervening step of typesetting either by Linotype or intertype. Moreover, the plates generated have a higher resolution than that presently possible with the more conventional stereotype techniques.

If desired, the write step by itself can be used to generate a printing plate for offset printing. As is well known to those skilled in the art, offset printing is a form of lithography (a planographic process), wherein a sensitized plate is exposed to strong light passing through a negative of the material to be printed. The image is transferred to the plate by photochemical action. A plate for lithographic processes, including offset, can be manufactured using the write step of the present invention. For example, the composite plate can consist of a substrate over which an ink receptive film has been coated. The film will be removed during the write step as explained above. The substrate may be made of a material that is not ink receptive. Of course, the ink receptive qualities of the film and substrate can be reversed. This now provides a lithographic plate having areas which are receptive to greasy ink and other areas which are not receptive. The film coating would preferably be of such a thickness as not to affect the photo-offset process. It would be a matter of choice as to whether the film or the substrate is receptive to the greasy ink.

Such a plate as described above differs from other offset plates in that it is generated by a thermal rather than a chemical or mechanical process.

Offset printing plates generally have a positive image of the graphics formed in the film of the plate. On the other hand, a letter press normally requires that a mirror image be cut in the film. Either a positive or a mirror image can be produced by the apparatus illustrated in FIGS. 2 and 3. A positive image can be produced by turning the scanning and writing optics (e.g., mirrors 48 and 48') in the same direction. On the other hand, a mirror image can be generated by rotating the scanning optics in the opposite direction. If necessary, a negative image can be formed in the printing plate by electronically inverting the on-off relationship between the reading laser and the writing laser.

Still further, it should be noted that the present invention is adaptable for use with computer techniques. Thus, a read-write apparatus 34 can be tied directly to computers being used for composing the pages.

In describing the operation of the present invention, it has been assumed that the information generated by reading the graphic 30 is transmitted immediately to the companion apparatus for the writing step in the formation of a printing plate. However, those skilled in the art should recognize that the information in electronic form can be stored for later use. Graphic information could be stored on magnetic tape in any conventional manner. If the graphic information is in a computer recognizable font, then it can be converted into digital or analog coded information and thereafter stored in an appropriate computer memory.

It should be noted that although a particular optical system has been described with respect to FIGS. 2 and 3, other optical systems can be used with equal or greater facility. For example, additional optics can be added to the system illustrated in FIG. 2 or enlarging or diminishing the written image relative to the scanned image. This can be accomplished, for example, by introducing at least one curved mirror between mirror 48' and the film 14. The effect of such a curved mirror is to expand, or contract, the overall dimensions of the image formed upon film 14 without affecting the size of the spot imaged on the coherent laser.

This may be particularly useful in the newspaper industry where the economics of newsprint usage require a reduction of the written image in the film 14.

The present invention may be embodied in other specific forms without departing from the spirit or essential attributes thereof, and accordingly, reference should be made to the appended claims, rather than to the foregoing specification as indicating the scope of the invention.

I claim:

1. Apparatus for forming a surface in relief in a composite plate of the type having a layer of material which is absorptive of a first wavelength of radiation but reflective of a second wavelength of radiation and a substrate which is absorptive of the second wavelength of radiation, comprising:
   first means for optically reading page composition information,
   second means operatively associated with said first means for selectively generating a first coherent radiation at said first wavelength, said first wavelength radiation having sufficient energy to remove selected portions of said layer of material and to expose corresponding portions of said substrate.
   third means operatively associated with said first means for selectively generating a second coherent radiation at said second wavelength, said second coherent radiation having sufficient energy to remove at least partially each of said exposed portions of said substrate.

2. Apparatus in accordance with Claim 1 wherein said first coherent radiation is more highly resolvable than said second coherent radiation.

3. Apparatus in accordance with claim 1 wherein said second and third means comprise at least two lasers of different wavelength.

4. Apparatus in accordance with claim 1 wherein the wavelength of said second coherent radiation is longer than the wavelength of said first coherent radiation.

5. Apparatus in accordance with claim 1 wherein said second coherent radiation is at a higher power level than said first coherent radiation.

6. Apparatus in accordance with claim 1 wherein said first means comprises a laser and photodetector operatively associated therewith.

7. Apparatus in accordance with claim 1 wherein said second means comprises a laser for generating coherent radiation having a wavelength in the visible spectrum and said third means comprises a laser for generating coherent radiation having a wavelength in the infrared spectrum.

8. Apparatus in accordance with claim 7 wherein the energy level of said second coherent radiation is greater than the energy level of said first coherent radiation.

9. Apparatus in accordance with claim 1 wherein said second means includes means for modifying the size of the image formed by said first coherent radiation in said layer of material.

* * * * *